(12) United States Patent
Lim (10) Patent No.: US 12,513,514 B2
(45) Date of Patent: Dec. 30, 2025

(54) ULTRA-WIDE BAND DEVICE AND ULTRA-WIDE BAND RANGING METHOD USING THE SAME

(71) Applicant: HYUNDAI MOBIS CO., LTD., Seoul (KR)

(72) Inventor: Jong Chul Lim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 433 days.

(21) Appl. No.: 18/085,721

(22) Filed: Dec. 21, 2022

(65) Prior Publication Data
US 2023/0336980 A1 Oct. 19, 2023

(30) Foreign Application Priority Data

Apr. 15, 2022 (KR) .................. 10-2022-0046715

(51) Int. Cl.
*H04W 12/0431* (2021.01)
*H04W 64/00* (2009.01)

(52) U.S. Cl.
CPC ..... *H04W 12/0431* (2021.01); *H04W 64/003* (2013.01)

(58) Field of Classification Search
CPC .......... H04W 12/0431; H04W 64/003
USPC .................................... 340/426.36
See application file for complete search history.

(56) References Cited

U.S. PATENT DOCUMENTS

| | | | |
|---|---|---|---|
| 2019/0394748 A1* | 12/2019 | Al-kadi | H04W 64/00 |
| 2023/0063790 A1* | 3/2023 | Lim | H04W 52/0225 |
| 2023/0171729 A1* | 6/2023 | Oh | H04L 5/0048 |
| | | | 455/456.1 |
| 2023/0209493 A1* | 6/2023 | Lim | H04B 1/7163 |
| | | | 455/456.1 |
| 2023/0276403 A1* | 8/2023 | Reddy | H04L 5/0048 |
| | | | 455/456.1 |
| 2023/0345369 A1* | 10/2023 | Lim | H04W 52/0225 |

\* cited by examiner

*Primary Examiner* — Kam Wan Ma
(74) *Attorney, Agent, or Firm* — NSIP Law (57) ABSTRACT

Disclosed is an ultra-wide band (UWB) device. The UWB device includes a memory configured to store instructions, and processors that execute the instructions to perform ranging through UWB with another UWB device, operate in a first mode in which a message is transmitted or received with a length of a first slot when a ranging operator is a UWB anchor and operate in a second mode in which the message is transmitted or received with a length of a second slot when the ranging operator is a digital key.

15 Claims, 10 Drawing Sheets

| | Nchap_per_slot | Tslot | Nslot_per_round | Tround | Nran | Tblock | Nround | SUCCESS RATE |
|---|---|---|---|---|---|---|---|---|
| Case#1 | 6 | 2ms(=1/3×6) | 12 | 24ms(=2×12) | 3 | 288ms(=96×3) | 12(=288/24) | 0/100 |
| Case#2 | 8 | 2.667ms(=1/3×8) | 12 | 32ms(=2.667×12) | 3 | 288ms(=96×3) | 9(=288/32) | 100/100 |
| Case#3 | 9 | 3ms(=1/3×9) | 16 | 48ms(=3×16) | 3 | 288ms(=96×3) | 6(=288/48) | /100 |
| Case#4 | 12 | 4ms(=1/3×12) | 12 | 48ms(=4×12) | 3 | 288ms(=96×3) | 6(=288/48) | 100/100 |

ULTRA-WIDE BAND DEVICE AND ULTRA-WIDE BAND RANGING METHOD USING THE SAME

CROSS-REFERENCE TO RELATED APPLICATION

This application claims the benefit under 35 USC § 119(a) of Korean Patent Application No. 10-2022-0046715, filed on Apr. 15, 2022, in the Korean Intellectual Property Office, the entire disclosure of which is incorporated herein by reference for all purposes.

BACKGROUND

1. Field

The present disclosure relates to an ultra-wide band (UWB) device, and an UWB ranging method using the same.

2. Description of Related Art

Technologies such as global positioning system (GPS), Wi-Fi, and Bluetooth are used to provide a local based service (LBS). These technologies have difficulties in precise measurement, but ultra-wide band (UWB; a frequency of 6 GHz to 8 GHz and a bandwidth of 500 MHz or more) has advantages in terms of a wide frequency band, low power communication, and positioning with high accuracy within tens of centimeters.

UWB technology can be used to calculate a distance between subjects by multiplying a signal arrival time between communication subjects by the speed of light using Time of Flight (ToF) technology. Unlike Wi-Fi and Bluetooth, UWB uses a wide frequency band and may transmit a large amount of information with a high transmission speed using little power.

Positioning using UWB technology has the advantage that an error rate is as low as about 20 centimeters, transmittance through an obstacle is high, and the positioning is not affected by other signals such as Wi-Fi.

In UWB ranging technology, when time synchronization (Time Sync) is not matched, a digital key firstly proceeds with ranging, and an anchor receives a Pre-poll message, a scrambled timestamp sequence (STS) of Poll should be calculated on the basis of a new Poll_STS_Index. However, since 2.667 ms is consumed for calculating the STS by an upper-level controller, when a slot interval is 2 ms or less, reception of a Poll message transmitted later fails.

The message reception failure causes a delay in a passive keyless entry (PKE) operation and forces a vehicle driver or user to wait.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided an ultra-wide band (UWB) device. The UWB device includes a memory configured to store instructions, and processors that execute the instructions to perform ranging through UWB with another UWB device, operate in a first mode in which a message is transmitted or received with a length of a first slot when a ranging operator is a UWB anchor and operate in a second mode in which the message is transmitted or received with a length of a second slot when the ranging operator is a digital key.

The ranging operator may be determined according to a time during which the other UWB device designated as the digital key remains within a UWB ranging region.

The ranging operator may be is determined as the UWB anchor in response to a determination that a time during which the other UWB device designated as the digital key remains within the UWB ranging region is less than a preset time.

The other UWB device designated as the digital key may transmit a Pre-poll message after a UWB setup message is transmitted from an upper-level controller.

The ranging operator may be determined as the digital key in response to a determination that a time during which the other UWB device designated as the digital key remains within the UWB ranging region is greater than or equal to a preset time.

The upper-level controller may transmit a UWB setup message after the other UWB device designated as the digital key transmits a pre-poll message.

The length of the second slot may be greater than the length of the first slot.

The length of the second slot may be set to be greater than a scrambled timestamp sequence (STS) code calculation time.

A UWB ranging method includes calculating a first time during which another UWB device designated as a digital key remains within a UWB ranging region, determining a ranging operator according to the first time, receiving a ranging start message from the ranging operator, and operating in a first mode in which a message is transmitted or received with a length of a first slot when the ranging operator is an UWB anchor and operating in a second mode in which the message is transmitted or received with a length of a second slot when the ranging operator is the digital key.

The determining of the ranging operator according to the first time may include determining that the ranging operator is the UWB anchor when a time during which the other UWB device designated as the digital key remains within the UWB ranging region is less than a preset time, and determining that the ranging operator is the digital key when the time during which the other UWB device designated as the digital key remains within the UWB ranging region is greater than or equal to the preset time.

The operating in the first mode may include transmitting a Pre-poll message by the other UWB device designated as the digital key after a UWB setup message is transmitted from an upper-level controller.

The operating in the second mode may include transmitting a UWB setup message by an upper-level controller after the other UWB device designated as the digital key transmits a Pre-poll message.

The length of the second slot is greater than the length of the first slot.

The length of the second slot may be set to be greater than a scrambled timestamp sequence (STS) code calculation time.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 1:
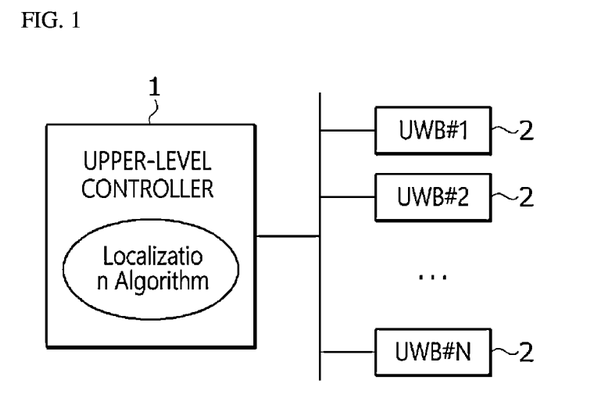
FIG. 1 is a conceptual diagram of an ultra-wide band (UWB) system according to an embodiment.

FIG. 1 is a conceptual diagram of an ultra-wide band (WB) system according to an embodiment.

UWB may mean a short-distance high-speed wireless communication technology using a wide frequency band of several GHz or more in a baseband state, a lower spectral density, and a short pulse width (1 nsec to 4 nsec). UWB may mean a band itself to which UWB communication is applied.

The UWB device 2 according to the embodiment may include a fixed terminal or a mobile terminal implemented as a computer device and may communicate with another device and/or server using a wireless or wired communication method. For example, the UWB device 2 may include a smart phone, a mobile phone, a laptop computer, a digital broadcasting terminal, a personal digital assistant (PDA), a portable multimedia player (PMP), a navigation device, a slate personal computer (PC), a table PC, a desktop computer, a digital television (TV), a refrigerator, an artificial intelligence speaker, a wearable device, a projector, a smart key, a digital key, a smart car, a printer, a vehicle console, and control device that controls at least partial function of a vehicle, but the present disclosure is not limited thereto.

In the embodiment, an example of a case in which the UWB device is installed in the digital key or the smart phone and a vehicle will be described.

The UWB device 2 according to the embodiment may perform device-to-device (D2D) communication. The D2D communication refers to a method in which geographically close devices directly communicate without through an infrastructure such as a base station. In the D2D communication, the devices may communicate in one-to-one manner, a one-to-many manner, or a many-to-many manner. The D2D communication may use an unlicensed frequency band as in Wi-Fi Direct and Bluetooth. Otherwise, the D2D communication may improve a frequency usage efficiency of a cellular system using a licensed frequency band. The D2D communication is limitedly used as a term referring to object-to-object communication or object intelligence communication. However, the D2D communication in the present embodiment may include both communication between various types of devices equipped with a communication function, such as a smart phone or a personal computer as well as communication between a simple device equipped with a communication function.

In the embodiment, an upper-level controller 1 may determine positions between the plurality of UWB devices using a ranging result value. The upper-level controller 1 may classify the UWB devices 2 into a plurality of nodes and analyze positions of the UWB devices 2 according to a distance relationship between the nodes. The upper-level controller 1 may set the plurality of UWB devices 2 mounted on the vehicle as anchor nodes, set the UWB devices 2 mounted on the digital key as tag nodes, and thus determine a position of each UWB device 2 according to a distance relationship between the anchor nodes and the tag nodes.

Figure 2:
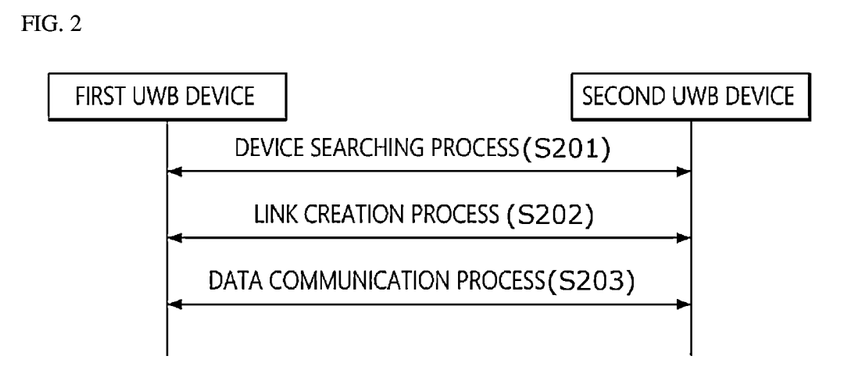
FIG. 2 is a view illustrating a communication process of a plurality of UWB devices.

FIG. 2 is a view illustrating a communication process of a plurality of UWB devices.

A first UWB device and a second UWB device may perform communication through a device searching process, a link creation process, and a data communication process.

In the device searching process, each of the first UWB device and the second UWB device may search for other UWB devices capable of the D2D communication among UWB devices therearound. Therefore, each of the first UWB device and the second UWB device may determine whether to create a link for the D2D communication. For example, the first UWB device may transmit a search signal so that the second UWB device may search for the first UWB device. Further, the first UWB device may receive a searching signal transmitted by the second UWB device and identify that other electronic devices capable of the D2D communication are positioned within a D2D communication range (S201).

In the link creation process, each of the first UWB device and the second UWB device may create a link for data transmission with a UWB device, to which data is to be transmitted, among the UWB devices searched in the device searching process. For example, the first UWB device may create a link for data transmission with the second UWB device searched in the device searching process (S202).

In the data communication process, each of the first UWB device and the second UWB device may transmit or receive data to or from the UWB devices that create the link in the link creation process. For example, the first UWB device may transmit or receive data to or from the second UWB device through the link created in the link creation process (S203).

Various embodiments of the present application relate to medium access control (MAC) based on the above-described D2D communication, and for the MAC, a distance between the UWB devices needs to be measured. In this case, UWB ranging technology may be used to measure a distance between the electronic devices.

In the embodiment, ranging refers to an action of measuring a distance between a UWB device (fob) and another UWB device (anchor), data structure may conform to IEEE802.15.4z standard, and about 200 us may be consumed for transmitting one packet.

Figure 3:
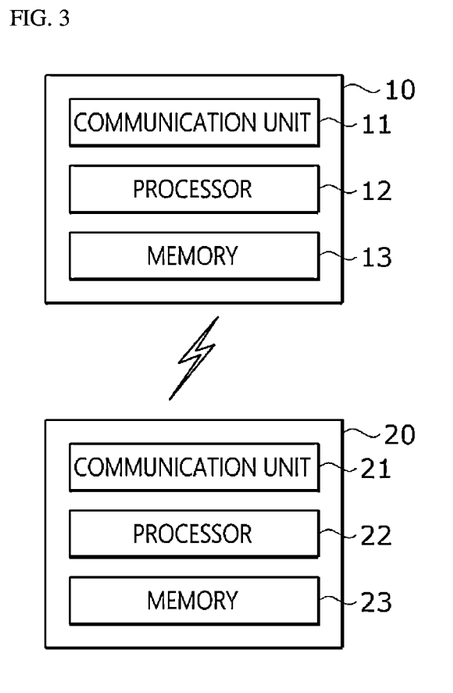
FIG. 3 is a block diagram of the UWB device according to the embodiment.

FIG. 3 is a block diagram of the UWB device 10 according to the embodiment. Referring to FIG. 3, the UWB device 10 according to the embodiment may perform ranging with another UWB device 20 through UWB and UWB and include a communication unit 11, at least one processor 12, and a memory 13 in which a UWB ranging program is embedded. Further, the other UWB device 20 may also include a communication unit 21, at least one processor 22, and a memory 23.

In the embodiment, the UWB device 10 is a UWB device installed in the vehicle and may function as an anchor, and the other UWB device 20 is a UWB device installed in the digital key and may function as a fob.

The communication unit 11 may transmit a ranging result by performing data communication with the upper-level controller 1 and receive a localization result from the upper-level controller 1. The communication unit 11 may perform the data communication with the upper-level controller 1 through an L-CAN bus and transmit the ranging result to the upper-level controller 1. Further, the localization result may be received from the upper-level controller 1 through the L-CAN bus.

The processor 12 may perform ranging through the UWB with the other UWB device 20 and measure a distance to the other UWB device 20.

For example, when the digital key stored in the smart phone is used to open or close a door of the vehicle, the vehicle may measure a distance between the smart phone and the vehicle using the plurality of UWB devices 10 (for example, eight UWB communication modules) and then estimate a position of the smart phone on the basis of the measurement result. When a distance between the vehicle and the smart phone becomes closer to a predetermined distance or less, the door of the vehicle may be automatically opened so as to improve convenience of a user. The vehicle and the smart phone may use multicast ranging or broadcast ranging.

Figure 4:
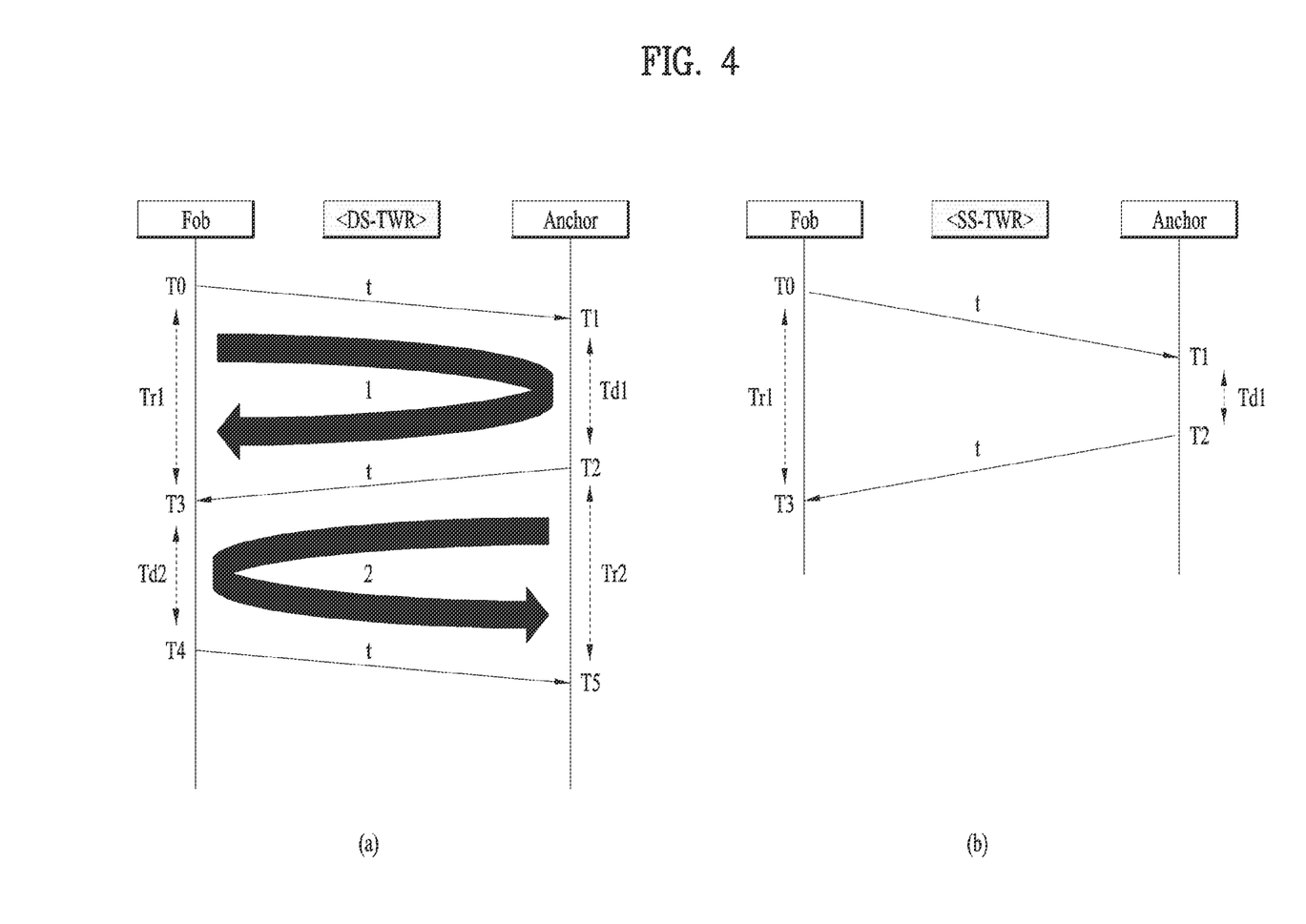
FIG. 4 are views illustrating a ranging process of a processor according to the embodiment.

FIG. 4 is a view illustrating a ranging process of a processor according to the embodiment.

FIG. 4 illustrates a two-way ranging (TWR) method such as (a) a double sided TWR (DSTWR) and (b) a single sided TWR (SSTWR).

Ranging refers to an action of measuring a distance between one fob and one anchor, data structure may conform to IEEE802.15.4z standard, and about 200 us may be consumed for transmitting one packet.

In the embodiment, the UWB device 10 may operate as an anchor. When the UWB device 10 according to the embodiment operates as the anchor, the other UWB device 20 may operate as the fob.

A slot may be defined as a time period from a time at which the fob or anchor transmits (or receives) a signal once to a time at which next transmission (or reception) is performed.

First, the fob transmits a poll packet and records a timestamp $T_0$.

Next, the anchor receives the poll packet and records T1.

Next, the anchor consumes a time $T_{d1}$ to receive a signal and generate a response packet, transmits a response message, and records $T_2$.

Next, the fob receives the response message and records $T_3$.

Next, the fob consumes a time $T_{d2}$ to receive the signal and generate a final message.

Next, the fob transmits the final message and records T4, and the anchor receives the final message and records $T_5$.

In the ranging process, the processor 12 may operate in a first mode in which the message is transmitted or received with a length of a first slot when a ranging operator is the UWB anchor and operate in a second mode in which the message is transmitted or received with a length of a second slot when the ranging operator is the digital key.

In the embodiment, the operator may be defined on the basis of a direction in which an initial message is transmitted in the ranging process. That is, when the initial message of the ranging is a direction from the UWB anchor through the upper-level controller to the digital key, the operator may be the UWB anchor, and when the initial message of the ranging is a direction through the digital key to the UWB anchor, the operator may be the digital key. That is, a subject that transmits an initial ranging message between the UWB anchor and the digital key may be defined as the operator.

In the embodiment, the ranging operator may be determined according to a time during which the other UWB device 20 designated as the digital key remains in a UWB ranging region. In the embodiment, an example in which the digital key is implemented in the smart phone is described. However, unlike this, an example in which a separate digital key may be implemented in the scope of the technical spirit of the present disclosure.

For example, when a time during which the other UWB device 20 designated as the digital key remains in the UWB ranging region is less than a preset time, the ranging operator may be the UWB anchor 1. That is, when a user possessing the digital key approaches the vehicle from a Bluetooth connection region, UWB ranging is performed between the UWB devices, and then a passive keyless entry (PKE) operation is operated, the ranging operator may be the UWB anchor 1. In this case, as will be described below, a ranging failure due to delay in an initial STS calculation is not a big problem.

Otherwise, when the time during which the other UWB device 20 designated as the digital key remains in the UWB ranging region is greater than or equal to the preset time, the ranging operator may be the digital key. That is, when a user possessing the digital key stays around the vehicle, the UWB ranging is temporarily paused to minimize power consumption. In this paused state, when a user attempts to toggle/touch a door handle to perform the PKE operation, the ranging operator may be the digital key. In this case, as will be described below, when the PKE operation is attempted, the operation is delayed during a plurality of ranging rounds due to the initial ranging failure. This delay may be considered as a large wait for a user.

In the embodiment, a length of the second slot may be greater than a length of the first slot.

Further, the length of the second slot may be set greater than an STS code calculation time. For example, the length of the first slot may be set to 2 ms, and the length of the second slot may be set to a time exceeding 2.667 ms.

That is, in the second mode, the length of the second slot is set greater than a time required to calculate an STS code, which is 2.667 ms, and thus loss due to the ranging failure can be minimized.

Further, in the first mode, the length of the first slot is set to minimize a period of the ranging rounds, and thus multi-ranging efficiency can be maximized.

Figure 5:
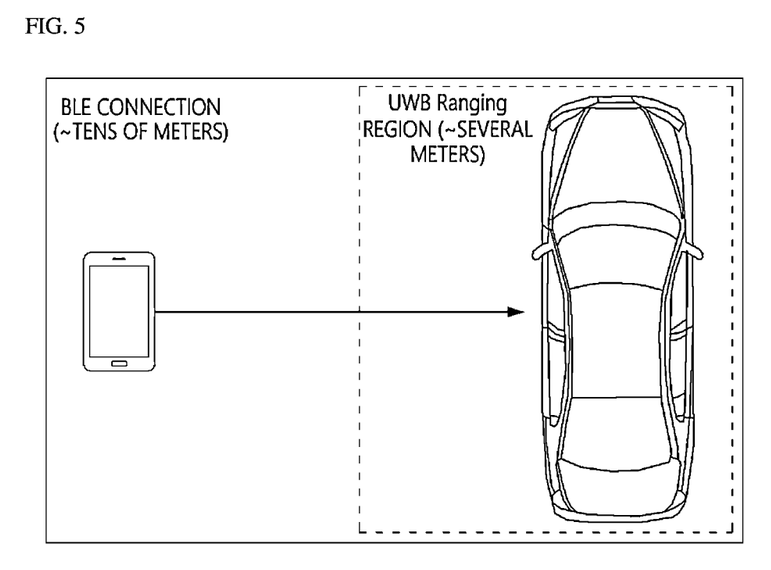
FIGS. 5 and 6 are views for describing an operation of the UWB device according to the embodiment.
Figure 6:
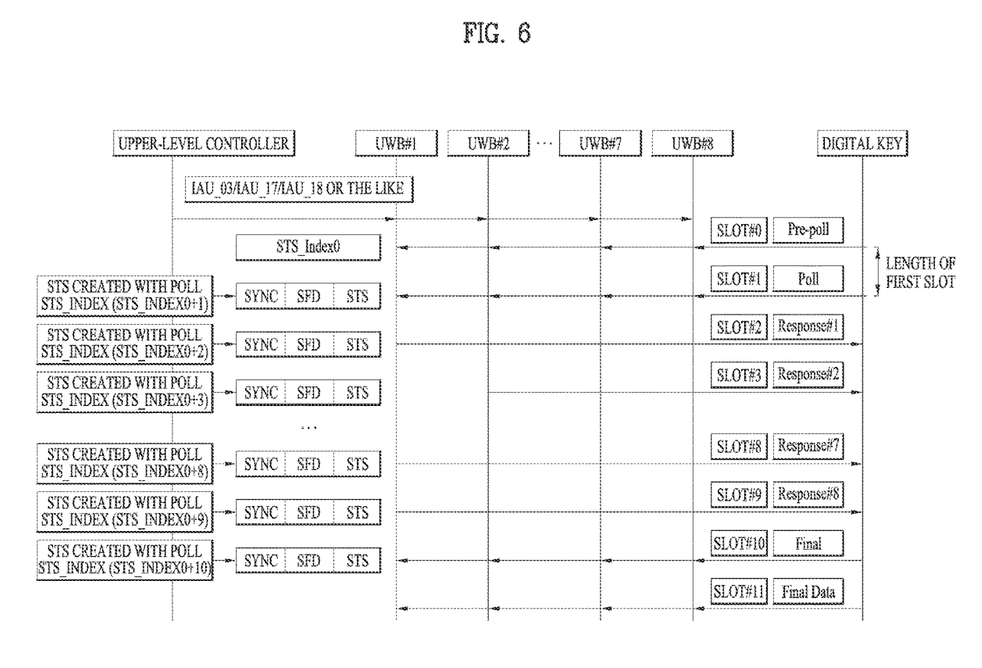

FIGS. 5 and 6 are views for describing an operation of the UWB device according to the embodiment.

Referring to FIG. 5, a user possessing the digital key approaches the vehicle from the Bluetooth connection region, UWB ranging is performed between the UWB devices, and the PKE operation is then performed. In this case, the ranging operator is the UWB anchor.

Referring to FIG. 6, the upper-level controller may mean an IAU (Identity Authentication Unit) or a BDC (Body Domain Controller), and eight UWB devices UWB #1 to UWB #8 may mean UWB anchors mounted on the vehicle. In FIG. 6, the ranging operator is the UWB anchor, and the processor operates in the first mode. In the first mode, the slot transmits or receives a message in the length of the first slot.

First, the upper-level controller transmits an UWB setup message to the UWB devices. Since the UWB setup message includes an STS_Index0 value, the UWB devices receiving the UWB setup message can calculate an STS value in advance using the STS_Index0 value.

Next, the digital key transmits a pre-poll message to each of the UWB devices from the first UWB device UWB #1 to the eighth UWB device UWB #8. In this case, a frame format having a structure including payload without the STS is used to transmit data such as a timestamp.

Next, the digital key transmits a Poll message to each of the UWB devices from the first UWB device UWB #1 to the eighth UWB device UWB #8. In this case, a frame format having a structure including the STS is used to stamp the timestamp.

Next, each of the UWB devices from the first UWB device UWB #1 to the eighth UWB device UWB #8 transmit a response message to the digital key in successive slots.

Next, the digital key receives the response messages from all eight UWB devices UWB #1-UWB #8 and then transmits a final message to each of the UWB devices form the first UWB device UWB #1 to the eighth UWB device UWB #8 in a slot.

Next, the digital key transmits final data to each of the UWB devices from the first UWB device UWB #1 to the eighth UWB device UWB #8 in a final slot of the ranging rounds. In this case, a frame format having a structure including payload without the STS is used to transmit data such as Pre-poll.

Figure 7:
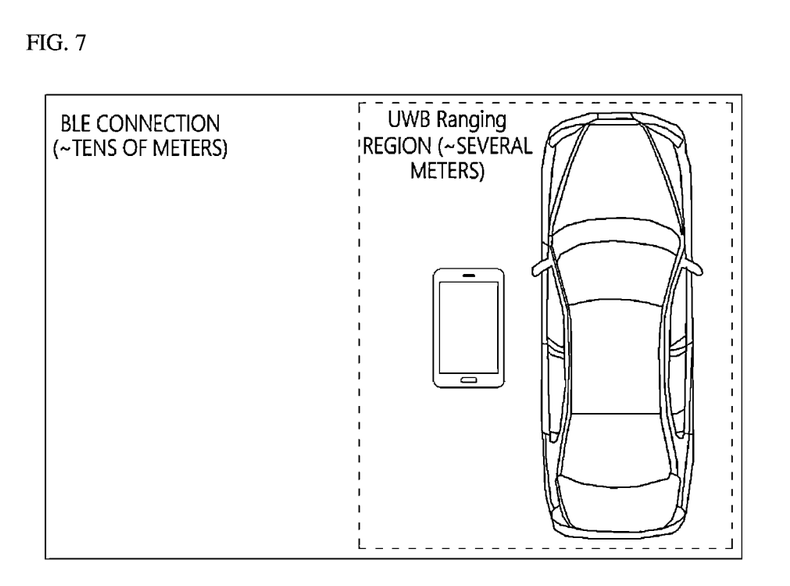
FIGS. 7 and 8 are views for describing an operation of a UWB device according to another embodiment.
Figure 8:
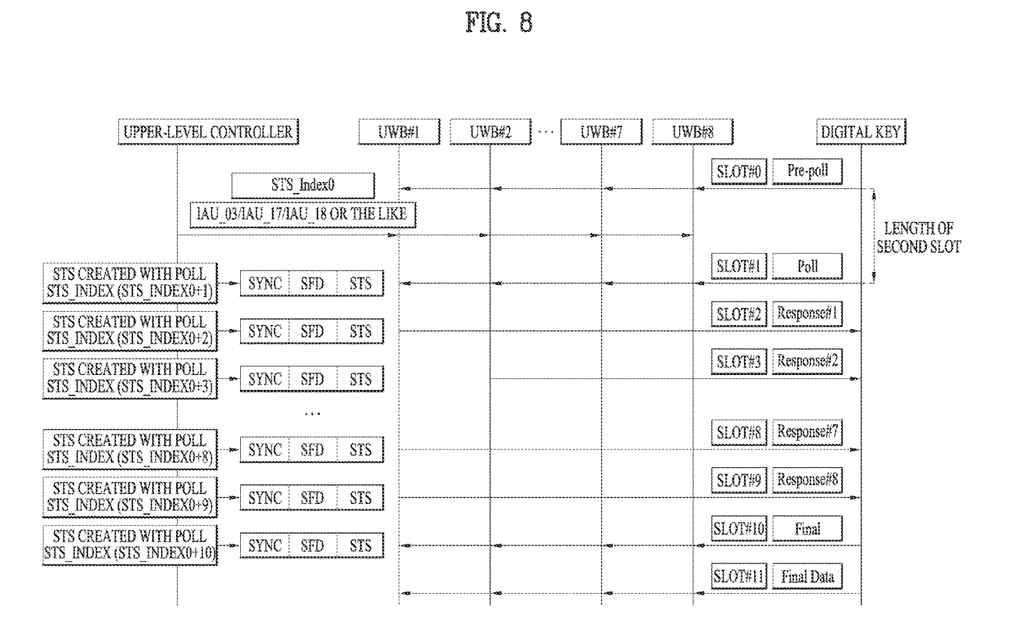

FIGS. 7 and 8 are views for describing an operation of a UWB device according to another embodiment.

Referring to FIG. 7, in a case in which a user possessing the digital key stays around the vehicle, the UWB ranging is temporarily paused to minimize power consumption. In this paused state, a user attempts to toggle/touch the door handle to perform the PKE operation, and in this case, the ranging operator may be the digital key.

Referring to FIG. 8, the upper-level controller may mean an IAU or a BDC, and eight UWB devices UWB #1 to UWB #8 may mean UWB anchors mounted on the vehicle. In FIG. 8, the ranging operator is the digital key, and the processor operates in the second mode. In the second mode, the slot transmits or receives a message in the length of the second slot.

First, the digital key transmits a pre-poll message to each of the UWB devices from the first UWB device UWB #1 to the eighth UWB device UWB #8. In this case, the frame format having a structure including a payload without the STS is used to transmit data such as a timestamp.

Next, the upper-level controller transmits the UWB setup message to the UWB devices UWB #1 to UWB #8. In this way, in a state in which the UWB setup message is received from the upper-level controller and thus the STS value is not previously calculated, a time is required to calculate a new STS value before a next Poll message is received from the digital key. The UWB device according to the embodiment operates in the second mode in which the length of the second slot is greater than the length of the first slot, to secure enough time to calculate the new STS value before receiving the Poll message, thereby preventing message reception failure. That is, the length of the second slot may be set to be greater than about 2.667 ms that is a time required to calculate the new STS value, and for example, the length of the second slot may be set to 3 ms.

Next, the digital key transmits the Poll message to each of the UWB devices from the first UWB device UWB #1 to the eighth UWB device UWB #8. In this case, the frame format having a structure including the STS is used to stamp the timestamp.

Next, each of the UWB devices from the first UWB device UWB #1 to the eighth UWB device UWB #8 transmits the response message to the digital key in successive slots.

Next, the digital key receives the response messages from all eight UWB #1-UWB devices UWB #8 and then transmits the final message to each of the UWB devices from the first UWB device UWB #1 to the eighth UWB device UWB #8 in a slot.

Next, the digital key transmits the final data to each of the UWB devices from the first UWB device UWB #1 to the eighth UWB device UWB #8 in a final slot of the ranging rounds. In this case, the frame format having a structure including payload without the STS is used to transmit data such as Pre-poll.

Figure 9:
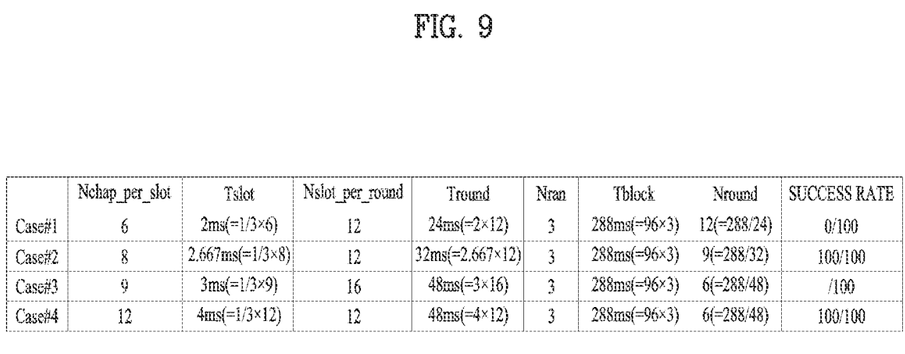
FIGS. 9 and 10 are views for evaluating performance of the UWB device according to the embodiment.
Figure 10:
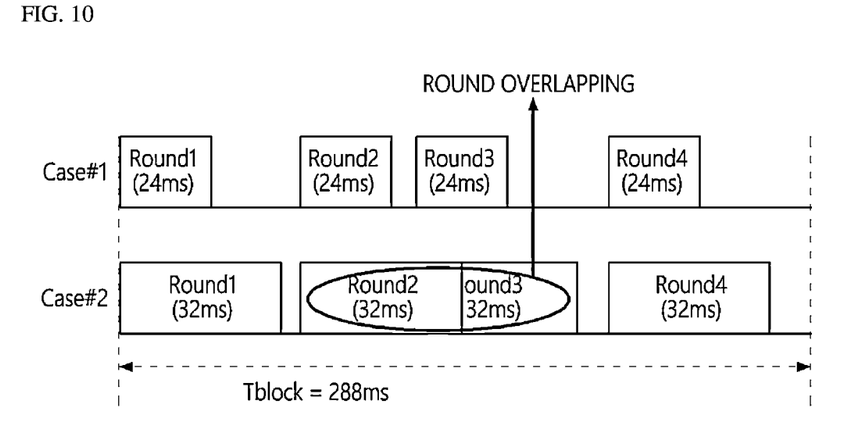

FIGS. 9 and 10 are views for evaluating performance of the UWB device according to the embodiment.

FIG. 9 illustrates a message transmission success rate according to a length of a slot in an environment in which the digital key operates as the ranging operator.

In FIGS. 9 to 10, the number of anchors is set to eight, and thus the number Nslot_per_round of slots is determined to be 12 during a ranging round period Tround. Further, a length Tblock of a block for performing multi-ranging is set to 288 ms.

In Case #1 of FIG. 9, a length Tslot of the slot is set to 2 ms. In Case #1, the length of the slot is shorter than a time required to calculate the STS value, and reception of all subsequent messages fails in a state in which the STS value is not calculated.

In Case #2, the length of the slot is set to 2.667 ms. In Case #2, the length of the slot is equal to the time required to calculate the STS value, and reception of all subsequent messages is successful in a state in which the STS value is calculated.

Further, in Case #3, the length of the slot is set to 3 ms. In Case #3, the length of the slot is equal to the time required to calculate the STS value, and reception of all subsequent messages is successful in a state in which the STS value is calculated.

Further, in Case #4, the length of the slot is set to 5 ms. In Case #4, the length of the slot is equal to the time required to calculate the STS value, and reception of all subsequent messages is successful in a state in which the STS value is calculated.

As illustrated in FIG. 9, when the length of the slot is set to be greater than or equal to the time required to calculate the STS value, reception of all subsequent messages is successful. However, when the length of the slot is infinitely long, the length of the ranging round becomes longer, and thus this is disadvantageous to UWB multi-ranging with the plurality of anchors.

FIG. 10 illustrates a multi-ranging process of Case #1 and Case #2 of FIG. 9.

In Case #1, one ranging round is 24 ms, and even when four fobs (digital keys) perform multi-ranging during a block during which the multi-ranging is performed, a round length is relatively short, and thus a possibility that the rounds overlap each other is low. That is, in Case #1, 12 rounds (Nround) may be performed during one block.

In Case #2, one ranging round is 32 ms, and when the four fobs (digital keys) perform multi-ranging during a block during which the multi-ranging is performed, a possibility that the rounds overlap each other is high. That is, in Case #2, 9 rounds (Nround) may be performed during one block.

In this way, when the length of the slot is fixed to 2 ms, and when the digital key operates as the ranging operator, a subsequent message cannot be received, and the resulting delay eventually leads to waiting of a user.

Further, when the length of the slot is fixed to 2.667 ms or more, and when performing the multi-ranging, the rounds overlap each other, which is disadvantages.

Thus, the UWB device according to the embodiment determines the ranging operator in consideration of a time during which an owner of the digital key remains around (for example, within a predetermined range of) the vehicle, accordingly, varies the length of the slot actively, and thereby improves both a message reception success rate and multi-ranging utilization.

Figure 11:
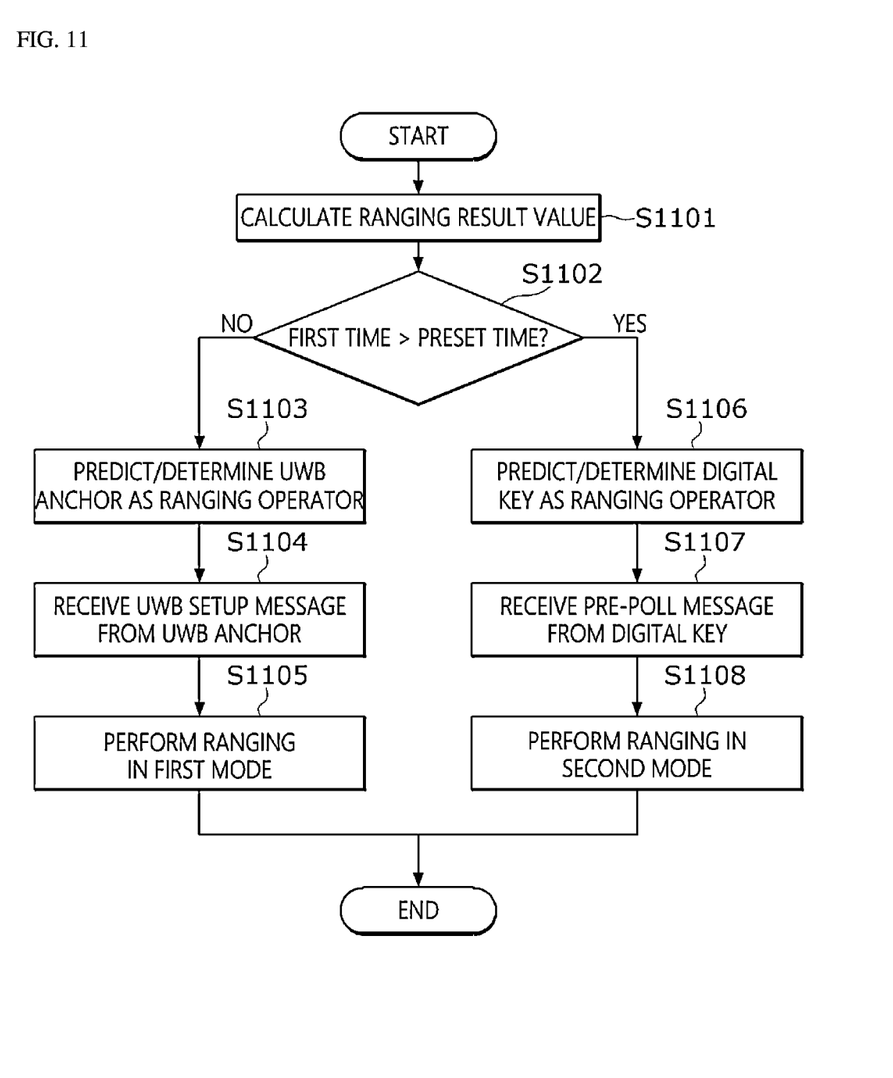
FIG. 11 is a flowchart of a UWB ranging method according to the embodiment.

FIG. 11 is a flowchart of a UWB ranging method according to the embodiment.

First, the UWB device calculates a first time during which the other UWB device designated as the digital key remains around (for example, within) the UWB ranging region (S1101).

Next, the UWB device determines the ranging operator according to the first time (S1102), That is, the UWB device determines the ranging operator as the UWB anchor when a time during which the other UWB device designated as the digital key remains around the UWB ranging region is less than a preset time (S1103).

Next, the UWB device receives the UWB setup message from the upper-level controller for the ranging S1104).

Next, the UWB device performs ranging by operating in the first mode in which the message is transmitted or received with the length of the first slot (S1105).

Otherwise, the UWB device determines the ranging operator as the digital key when a time during which the other UWB device designated as the digital key remains around (or within) the UWB ranging region is greater than or equal to the preset time (S1106).

Next, the UWB device receives a Pre-poll message from the other UWB device that is the ranging operator, that is, the digital key (S1107).

Next, the UWB device performs ranging by operating in the second mode in which the message is transmitted or received with the length of the second slot. In this case, the length of the second slot is set to be greater than the length of the first slot and is set to be greater than the STS code calculation time.

The present disclosure has been made in an effort to solve problems in the related art, and the present disclosure is directed to an ultra-wide band (UWB) device and a UWB ranging method that can prevent a delay in a passive keyless entry (PKE) operation regardless of a relative position between a vehicle and a digital key.

The present disclosure provides these advantages in contrast to systems such as GPS, Wi-Fi, and Bluetooth.

GPS and mobile communication network-based position tracking technology may have an error range of 5 to 50 m and an error range of 50 m to 200 m, respectively, and in the case of GPS, it may be difficult for a signal from a satellite to reach among a concrete jungle of buildings in a city.

In the case of Wi-Fi, location tracking may be performed at low cost, but since a frequency band used is narrow, channel division may be limited when the number of position tracking targets increases. Further, a mobile terminal may be disconnected from a fixed Wi-Fi access point (AP).

With Bluetooth, a plurality of sensors may be arranged at low cost, but a communication latency is high, and thus Bluetooth is not suitable for tracing positions in real time in a dynamic environment.

The present disclosure may provide an ultra-wide band (UWB) device which can prevent a delay in a passive keyless entry (PKE) operation regardless of a relative position between a vehicle and a digital key, and a UWB ranging method using the same and without the above-mentioned disadvantages of GPS, Wi-Fi, and Bluetooth.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

The term "~unit" used in the present embodiment refers to software or hardware components such as a field-programmable gate array (FPGA) or an application specific integrated circuit (ASIC), and "~unit" performs certain roles. However, "~unit" is not limited to the software or the hardware. "~unit" may be present in an addressable storage medium or may refresh one or more processors. Thus, as an example, "~unit" includes components such as software components, object-oriented software components, class components, and task components and may include processes, functions, properties, procedures, sub-routines, segments of a program code, drivers, firmwares, microcodes, circuits, data, database, data structures, tables, arrays, and variables. Functions provided in the components and "~unit" may be combined into a smaller number of components and "~units" or may be further separated into additional components and "~units". In addition, the components and "~units" may be implemented to reproduce one or more central processing units (CPUs) in a device or a security multimedia card.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An ultra-wide band (UWB) device, the UWB device comprising:
 a memory configured to store one or more instructions; and
 one or more processors configured to execute the one or more instructions to:
  perform ranging through UWB with another UWB device;
  determine a ranging operator based on which of the UWB device or the other UWB device initiates a ranging operation;
  operate in a first mode in which a message is transmitted or received with a length of a first slot when a ranging operator is the UWB device and the UWB device operates as a UWB anchor; and
  operate in a second mode in which the message is transmitted or received with a length of a second slot when the ranging operator is the other UWB device and the other UWB device operates as a digital key,
  wherein the length of the second slot is greater than the length of the first slot, and the length of the second slot is set to be greater than a scrambled timestamp sequence (STS) code calculation time.

2. The UWB device of claim 1, wherein the ranging operator is determined based on a time during which the other UWB device designated as the digital key remains within a UWB ranging region.

3. The UWB device of claim 2, wherein the ranging operator is determined as the UWB anchor when the time during which the other UWB device designated as the digital key remains within the UWB ranging region is less than a preset time.

4. The UWB device of claim 3, wherein the other UWB device designated as the digital key transmits a Pre-poll message after a UWB setup message is transmitted from an upper-level controller.

5. The UWB device of claim 2, wherein the ranging operator is determined as the digital key when the time during which the other UWB device designated as the digital key remains within the UWB ranging region is greater than or equal to a preset time.

6. The UWB device of claim 5, wherein the upper-level controller transmits a UWB setup message after the other UWB device designated as the digital key transmits a pre-poll message.

7. The UWB device of claim 1, wherein the length of the second slot is configured to ensure completion of STS code calculation before reception of the subsequent Poll message.

8. The UWB device of claim 1, wherein the STS code calculation time is greater than 2.667 milliseconds and the second slot is set to be greater than 2.667 milliseconds.

9. A method of performing UWB ranging between a first UWB device and a second UWB device, comprising:
calculating a time during which the second UWB device, designated as a digital key, remains within a UWB ranging region;
determining a ranging operator based on whether the first UWB device or the second UWB device initiates a ranging operation; and
operating the first UWB device in a first mode in which a message is transmitted or received with a length of a first slot when the first UWB device is the ranging operator and functions as a UWB anchor and
operating the first UWB device in a second mode in which the message is transmitted or received with a length of a second slot when the second UWB device is the ranging operator and functions as a digital key,
wherein the length of the second slot is greater than the length of the first slot, and the length of the second slot is set to be greater than a scrambled timestamp sequence (STS) cose calculation time.

10. The method of claim 9, wherein determining the ranging operator comprises:
determining that the ranging operator is the UWB anchor when the time during which the second UWB device remains within the UWB ranging region is less than a preset time, and
determining that the ranging operator is the digital key when the time is greater than or equal to the preset time.

11. The method of claim 10, wherein operating in the first mode includes transmitting a Pre-poll message by the digital key after a UWB setup message is transmitted from an upper-level controller.

12. The method of claim 10, wherein operating in the second mode includes transmitting a UWB setup message by an upper-level controller after the digital key transmits a Pre-poll message.

13. The method of claim 9, wherein the second slot is set to exceed a time duration required for a scrambled timestamp sequence code (STS) calculation.

14. The method of claim 13, wherein the STS cod calculation time is greater than 2.667 milliseconds and the second slot is set to be greater than 2.667 milliseconds.

15. An ultra-wide band (UWB) device comprising:
a memory configured to store one or more instructions; and
one or more processors configured to execute the one or more instructions to:
determine a first slot duration and a second slot duration;
perform a ranging operation with another UWB device;
determine whether the other UWB device has remained within a predetermined physical range for a threshold amount of time;
initiate ranging using the second slot duration when the threshold amount of time is met; and
initiate ranging using the first slot duration when the threshold amount of time is not met, wherein the second slot duration is set to exceed a predefined processing latency value required for cryptographic code generation.

* * * * *